G. M. STONE.
POWER TRANSMISSION MECHANISM FOR MOTOR VEHICLES.
APPLICATION FILED SEPT. 4, 1913.
1,137,549. Patented Apr. 27, 1915.
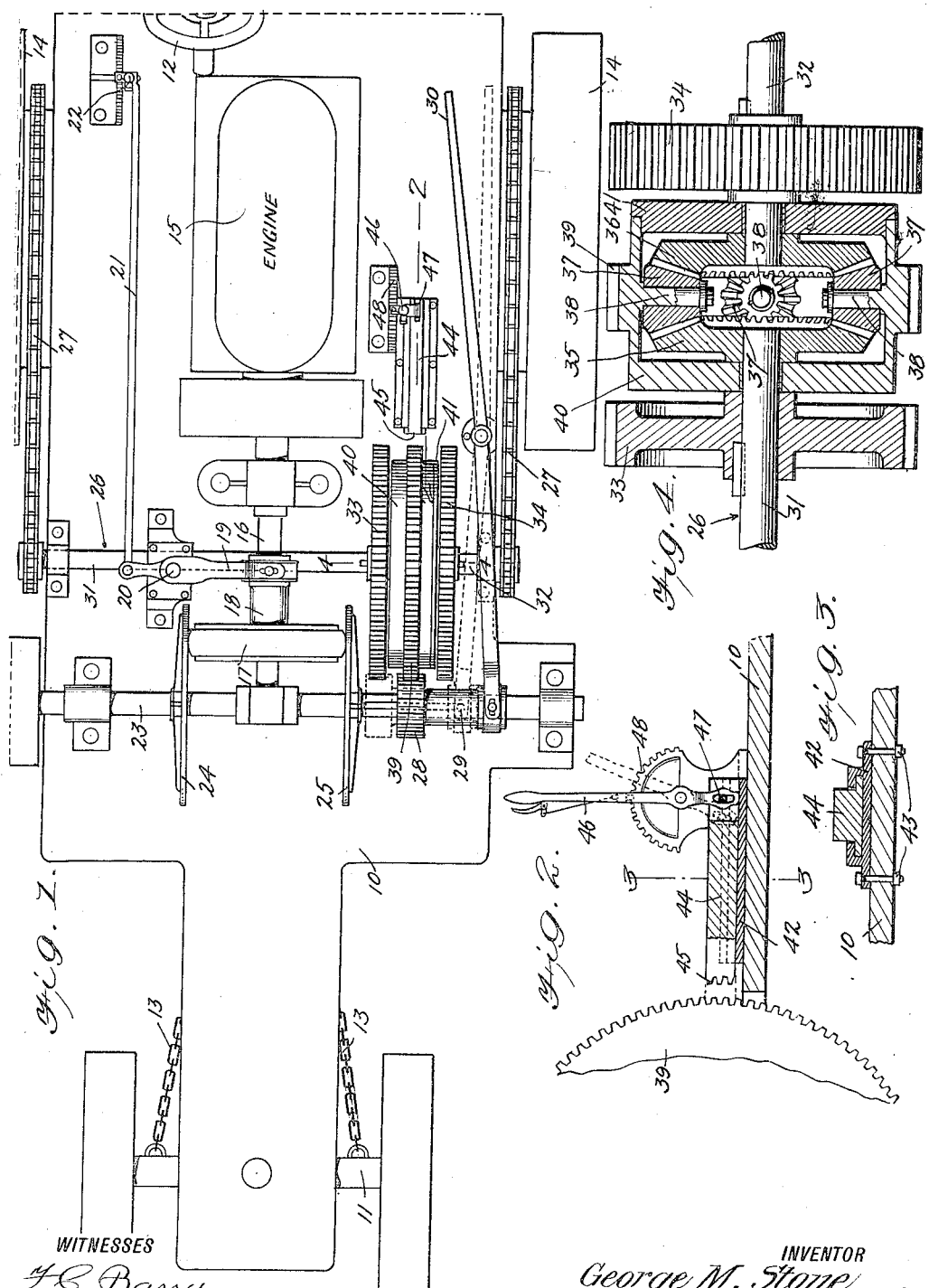
WITNESSES
INVENTOR
George M. Stone
BY
ATTORNEYS

UNITED STATES PATENT OFFICE.

GEORGE M. STONE, OF GRISWOLD, IOWA.

POWER-TRANSMISSION MECHANISM FOR MOTOR-VEHICLES.

1,137,549.  Specification of Letters Patent.  Patented Apr. 27, 1915.

Application filed September 4, 1913. Serial No. 788,103.

*To all whom it may concern:*

Be it known that I, GEORGE M. STONE, a citizen of the United States, and a resident of Griswold, in the county of Cass and State of Iowa, have invented a new and Improved Power-Transmission Mechanism for Motor-Vehicles, of which the following is a full, clear, and exact description.

This invention relates to an improved power transmission or drive mechanism for motor vehicles such as tractors, motor trucks and the like.

The essential object of the invention is comprehended in the provision of an improved mechanism of the above character whereby power transmitted from a suitable drive shaft to the power axle or shaft of a vehicle or machine may be employed so that two sections or power shafts may be driven simultaneously and at equal speeds in one direction, or in opposite directions, or whereby one of the sections may be driven while the other section remains stationary, thus effectively permitting the shaft or vehicle to be propelled forwardly or backwardly, or in the event of a vehicle turned at short angles approximately squarely around.

With the above and other objects in view, the invention resides more particularly in the peculiar combination and arrangement of parts which will be illustrated as a preferred embodiment in the accompanying drawings and described in the specification.

Reference is to be had to the accompanying drawings forming a part of this specification, in which similar characters of reference indicate corresponding parts in all the views, and in which—

Figure 1 is a plan view of a farm tractor having the invention applied thereto; Fig. 2 is a longitudinal sectional view on the line 2—2 of Fig. 1 with the parts considerably enlarged; Fig. 3 is a vertical sectional view on the line 3—3 of Fig. 2; and Fig. 4 is an enlarged cross sectional view on the line 4—4 of Fig. 1.

To illustrate the operation and one of the various uses of the invention there is shown a farm tractor having a frame 10 provided with a front steering axle 11 and suitable ground wheels journaled thereon and designed to be shifted from a steering wheel 12 connected to the steering axle, as shown at 13.

The drive wheels are indicated by the numeral 14 and are suitably fixed to or journaled on the rear axle of the machine. A motor 15 is mounted on the frame, said motor being preferably of the internal combustion type and carrying at the forward end of its crank shaft 16 a friction wheel 17 which is provided with a sleeve 18 having a groove engaged by the forked portion of a lever 19. The lever is suitably pivoted on the frame, as shown at 20, and has its free end connected by a rod 21 to an adjustable throw lever 22 also mounted on the frame closely adjacent to the steering wheel 12, it being understood that shifting of the lever 22 will cause the friction wheel 17 to be shifted simultaneously in the same direction therewith.

Horizontally journaled across the frame 10 is a drive or jack shaft 23 having fixed thereto a pair of spaced friction disks 24 and 25 between which the friction wheel 17 engages, whereby when the friction wheel is brought into contact with either of the friction disks the direction of rotation in which the shaft 23 is driven is reversed, whereas longitudinal shifting of the friction wheel toward and away from the peripheral edges of the friction disks will cause the speed of rotation of the shaft 23 to be varied. The shaft 23 is designed to be shifted transversely of the frame to cause the friction wheel 17 to contact with either of the disks, according to the direction in which it is desired to drive the shaft 23. A driven means 26 is also journaled on the frame and at its extremities is operatively connected to the drive wheels 14 to cause rotation of the latter, as by means of endless chains 27 engaged around sprockets carried by the wheels and the ends of said driven shaft respectively.

In order to transmit motion from the intermediate or jack shaft 23, which may be motor shaft, jack shaft or sub jack shaft, a pinion 28 is splined on said shaft and is provided with a sleeve 29 having a grooved portion engaged by one end of a contact lever 30 suitably pivoted intermediate its ends on the frame, thus permitting the pinion to be shifted in the manner indicated in the full and dotted lines in Fig. 1 of the drawings. The driven means 26, which may be a jack shaft or the axle of a vehicle, and which is adapted for driving the wheels 14 through the medium of the chains 27 as above explained, is made up of two shafts or sections 31 and 3? the same having fixed thereto spur gears 33 and 34, respectively, while the spaced inner ends of said sections are provided with a differential gear connection for a purpose to be hereinafter made apparent. This differential gearing, which may be of the spur gear type, embodies beveled gears 35 and 36, respectively fixed to the inner ends of the shaft sections 31 and 32, and these gears are disposed in mutually adjacent positions for simultaneous contact or intermeshing engagement by a plurality of beveled pinions 37 journaled on stud shafts 38 projecting inwardly from an intermediate spur gear 39. All of the spur gears are of the same diameter, but the spur gear 39 is part of or secured to a casing which consists of an integral side 40 and a detachable side 41 which forms a closure for the hollow part of the casing in which the aforesaid beveled gears are housed.

Carried by the frame 10 in rear of or in any convenient position to the spur gear 39 is a grooved plate 42, the same being fixed to the frame or platform, as shown at 43, by means of bolts extending through flanges projecting from the sides of the plate. A locking device is provided to hold the gear 39 stationary, such device as illustrated consisting of a bar 44 conforming to the cross section of the groove in the plate 42 and slidable in the latter, and has one end adjacent to the spur gear 39 formed with one or more teeth 45 designed to intermesh with the teeth of said spur gear. In order to shift the locking bar, a throw lever 46 is connected at its lower end to the bar, as shown at 47, and operates on a segmental rack 48 to hold the bar in adjusted position into or out of engagement with the spur gear. This may be accomplished by a pinion splined on a stationary shaft and shifted into or out of engagement with spur gear 39 as in the manner of pinion 28 or other means.

Thus, with the parts constructed as above described and with the shaft 23 driven in the proper direction and at the proper speed, it will be seen that when the pinion 28 is disposed in mesh with the spur gear 39 which is connected to the shaft sections through the differential gearing above described, the beveled pinions 37 will drive both gears 35 and 36 and their shafts in the same direction during the time that the latter encounter equal resistances. When the parts operate in this manner, the pinions 37 will be locked by the opposed gears 35 and 36, meshing therewith, and the pinions 37 will act as rigid members to move bodily with the spur gear 39 and thus rotate the gears 35 and 36 and their shaft sections simultaneously in the same direction, but when the shafts or shaft sections 31 and 32 encounter varying resistances they will rotate at different speeds, the section meeting with the greater resistance running slower while the pinions 37 race on the bevel gear of the gears 35 and 36 meshing with the pinions 37 and which is attached to said slower running shaft section. When the pinion 28 is disposed in mesh with either of the spur gears 33 or 34, its attached shaft section will be driven, thus turning one wheel only while the other remains stationary, whereby, with the front wheels turned at the proper angle, the machine will be caused to turn around as with one wheel on a pivot. This operation is permitted by reason of the fact that the spur gear 39 and its casing, together with the beveled pinion 37 carried thereby, will rotate with the beveled gears 35 or 36, depending upon which of the latter is driven so that the spur gear and shaft section which are not directly driven will remain stationary. However, when the pinion 28 is shifted into mesh with either of the spur gears 33 or 34 and the locking bar 44 is shifted by the throw lever 46 to engage the teeth of the spur gear 39 so as to hold the latter stationary or in locked position, said spur gear 39 will be held from rotation in either direction and by reason of the differential gear arrangement the shaft sections will be driven in opposite directions to cause the machine to turn around as if the center of the rear axle was on a pivot. Thus, the device is constructed in such a manner that with the steering wheels turned at the proper angle, very short turns may be accomplished.

Having thus described my invention, what I claim as new and desire to secure by Letters Patent is:—

1. In a power transmission mechanism, the combination with a driven means for transmitting rotation and comprising separate sections and a drive shaft; of means coöperatively connecting said drive shaft and said sections, whereby the latter may be driven simultaneously in the same or opposite directions.

2. In a power transmission mechanism, the combination with a driven means for transmitting rotary motion and comprising separate sections and a drive shaft; of means coöperatively connecting said first-named shaft sections to the drive shaft, whereby the sections may be driven simultaneously in the same or opposite directions or independently.

3. The combination with the drive wheels of a vehicle, a shaft and a motor for driving the same; of driven shaft sections each having operative connections with the drive wheels, and coöperative means carried by the first-named shaft and the adjacent ends of the shaft sections, for causing independent or simultaneous rotation of said sections.

4. The combination with the drive wheels of a vehicle, a drive shaft and a motor for driving the same; of driven shaft sections each having operative connections with the drive wheels, a pinion slidable on the drive shaft to rotate therewith, gears fixed to each section of the driven shaft sections, and an intermediate gear having operative connections with said sections, whereby when the pinion is in engagement with either of said first-named gears the corresponding section will be driven independently of the other section, and whereby when said pinion is in engagement with the intermediate gear both sections will be simultaneously driven.

5. The combination with the drive wheels of a vehicle and a drive shaft therefor; of a driven means for transmitting rotation to said wheels, said means comprising sections each having operative connections with the drive wheels, a pinion slidable on the drive shaft to rotate therewith, spur gears fixed to each section of the driven means, an intermediate spur gear having operative connections with said sections whereby when the pinion is in engagement with either of said first-named spur gears the corresponding section will be driven independently of the other section, and whereby when said pinion is in engagement with the intermediate spur gear both sections will be simultaneously driven, and means for holding said intermediate spur gear stationary, whereby said sections may be driven in opposite directions when the pinion is rotated in mesh with either.

6. The combination with a prime mover and a shaft rotated therefrom; of a pair of driven members, and means coöperatively connecting said shaft and driven members for driving said members reversely in opposite directions, or independently or simultaneously in the same direction, while the prime mover is operating in one direction.

In testimony whereof I have signed my name to this specification in the presence of two subscribing witnesses.

GEORGE M. STONE.

Witnesses:
C. E. WOODWARD,
J. H. ALEXANDER.

Copies of this patent may be obtained for five cents each, by addressing the "Commissioner of Patents, Washington, D. C."